United States Patent Office 2,779,773
Patented Jan. 29, 1957

2,779,773

STEROID 3,16α-DIOLS AND PROCESS

Max N. Huffman, Oklahoma City, Okla., assignor to Nepera Chemical Co., Inc., Yonkers, N. Y., a corporation of New York No Drawing. Application May 23, 1956,
Serial No. 586,637

13 Claims. (Cl. 260—397.5)

This invention relates to compounds of the cyclopentanopolyhydrophenanthrene series and it relates more particularly to a steroid of the estrogen or androgen group in which the alcohol on the $C_{16}$ position or the ether or ester derivatives thereof is formed with an α configuration and it relates also to a method for the preparation of same. This application is a continuation-in-part of my copending application S. No. 532,111, filed on September 1, 1955, now abandoned.

It is an object of this invention to produce and to provide a method for producing a steroid in which the $C_{16}$ position is formed with an α-hydroxy group or an ether or ester derivative thereof and in which the other functional groups of the steroid are formed with a ketone group or a hydroxy group or an ether or ester derivative thereof on the $C_3$ position and without a functional group at the $C_{17}$ position.

Another object is to produce and to provide a method for producing estradiol-3,16α, the corresponding diacetate, dibenzoate, 3-monobenzoate, 3-methyl ether 16-acetate and other estradiol compounds and ether and ester derivatives thereof.

A further object is to produce and to provide a method for producing androstane-3β,16α-diol and the corresponding ether and ester derivatives thereof, such as the diacetate, dibenzoate, 3-monobenzoate, 3-methyl ether 16-acetate, and other androgen-16α-diols and corresponding ether and ester derivatives thereof.

A still further object is to produce and to provide a method for producing steroids wherein the spatial configuration in the $C_{16}$ position is α as distinguished from β and it is a related object to provide a method of epimerization to convert the β configuration to α on the cyclopentanopolyhydrophenanthrene molecule.

As used herein, the term "steroid" is intended to include cyclopentanopolyhydrophenanthrene compounds having the following nucleus

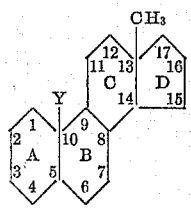

in which the rings A, B, C, and D may be either saturated or unsaturated between the ring carbon atoms. Some of the rings, such as ring A, may have one, two or as many as three unsaturated carbon to carbon linkages in the ring as in the compounds based upon estrone or in which unsaturation exists only in one of the rings, such as in ring B, as represented by some of the androgen compounds. Representative of such compounds are the well known estrogen compounds, such as estrone (3-hydroxy-17-keto-$\Delta^{1,3,5}$-estratriene), equilenin (3-hydroxy-17-keto-$\Delta^{1,3,5,6,8}$-estrapentaene), equilin (3-hydroxy-17-keto-$\Delta^{1,3,5,7}$-estratetraene), and androgen compounds androsterone (3α-hydroxy-17-keto-androstane), dehydroisoandrosterone (3β-hydroxy-17-keto-$\Delta^5$-etioallocholene), and androstenedione (3,17-diketo-etioallocholene). Characteristic of these natural hormones is the presence of a ketone or hydroxy function on the $C_3$ position and either a ketone or hydroxy function on the $C_{17}$ position. When $C_{10}$ is not joined as a part of an unsaturated carbon to carbon linkage in the ring structure then it will carry the substituent Y which can be either hydrogen or methyl.

By way of modification to improve the characteristics of the hormone and the utility thereof, I have succeeded in transposing the ketone function in various hormones from the $C_{17}$ position to the $C_{16}$ position to provide the 16-keto steroids as described in my previously issued Patent No. 2,636,043.

Instead of transposing the ketone group from $C_{17}$ to the $C_{16}$ position in the steroid molecule, I have succeeded merely in adding a ketone function to the $C_{16}$ position to provide steroids having ketone groups on both the $C_{16}$ and $C_{17}$ positions of the molecule, as described in my patent No. 2,522,178. By way of still further modification, I have succeeded in synthesizing steroids in which the keto group on the $C_{17}$ position is transferred to the $C_{16}$ position while a hydroxy group is provided instead of the keto group on the $C_{17}$ position to form the corresponding 16-keto hydroxy steroids, as described in my issued Patents No. 2,661,357 and No. 2,682,548.

Further, instead of transferring the ketone function from the $C_{17}$ position to the $C_{16}$ position, the steroid molecule has been modified by reduction of the ketone group on the $C_{16}$ position to a hydroxy group while also providing a hydroxy group on the $C_{17}$ position to form the corresponding 3,16,17 triols or the 16,17-dihydroxy steroids, as described in my recently issued Patent No. 2,584,271.

More recently, I have succeeded further to modify the steroid molecule by reduction reaction of estrone-16 ($\Delta^{1,3,5}$-estratriene-3-ol 16-one) with hydrogen in the presence of an Adams catalyst or with sodium borohydride and the like to produce the corresponding estradiol-3,16β which can be esterified or etherified to give the corresponding mono- or di-ester as well as the mono- or di-ether or mixtures thereof, as described in my Patent No. 2,705,239, issued on March 29, 1955.

When, as described in the aforementioned issued patent No. 2,705,239, the estrone-16 or 16-keto-3-hydroxy-$\Delta^{1,3,5}$-estratriene is reduced by sodium borohydride or by hydrogen in the presence of Adams catalyst, the hydroxy group forms on the $C_{16}$ position in the β configuration, as in the product estradiol-3,16β.

It has been found the estradiol-3,16β has negligible estrogenic activity whereas the epimer estradiol-3,16α enjoys considerable estrogenic activity. Where ring D displacement of the carbinol group having the β configuration from $C_{17}$, as in natural estradiol, to $C_{16}$, as in estradiol-3,16β, results in almost total loss of estrogenic potency, the α configuration for the alcohol at $C_{16}$, as in estradiol-3,16α, confers considerable estrogenic activity. From the standpoint of physical characteristics, the estradiol-3,16α is more dextro-rotatory than the β epimer and it differs further therefrom in many other respects, such as melting points and the like. Thus it is desirable to produce and to provide a method for producing such estrogen compounds as estradiol and the ether and ester derivations thereof wherein the spatial configuration of the hydroxy group on the $C_{16}$ position is α rather than β and it is desirable also to provide compounds having such configuration in the androgen series of compounds.

While description herein will be limited to the preparation of a steroid having the α configuration for the $C_{16}$ alcohol, it will be understood that the invention includes derivatives thereof in which the alcohol on the $C_{16}$ position having the α configuration is present also as the corresponding ether and ester derivatives thereof such as the acetate, propionate, butyrate, stearate, cyclopentylpropionate, phenyl acetate, benzoate, p-methyl benzoate and the like and in which the function of the C₃ position is in the form of a hydroxy group as in the steroid 3,16α-diol, or the corresponding ether and ester derivatives thereof, which may be represented by the following structural formula:

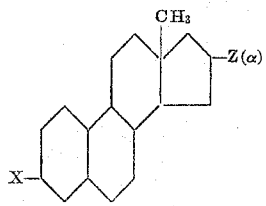

wherein X and Z are either OH, OCH₂R' or OOCR', and wherein R' is a group such as hydrogen, methyl, ethyl, propyl, butyl, n-pentadecyl, n-heptadecyl, cyclopentylethyl, phenyl, benzyl, tolyl, naphthyl or other aliphatic, aromatic, or lower aliphatic-aromatic group.

The epimerization reaction whereby a steroid compound containing a 16β-hydroxy group is converted to the stereo isomeric 16α-hydroxy configuration is novel for the C₁₆ position in steroid chemistry. The reaction is a generic one and is operative not only in the case of compounds of the androstane series, but is equally effective in epimerizing compounds in the estrane group. In each instance when starting with the free 16β-ol, the 16β-hydroxyl group is converted to the aryl sulfonate by reaction with an aryl sulfonyl chloride such as benzene sulfonyl chloride, p-toluene sulfonyl chloride, or a naphthalene sulfonyl chloride and the steroid carrying the 16β-aryl sulfonate is reacted with sodium acetate in acetic acid to convert the 16β-aryl sulfonate group to a 16α-acetate substituent. Hydrolysis of the 16α-acetate yields the desired 16α-diol form. Schematically the reaction is as follows:

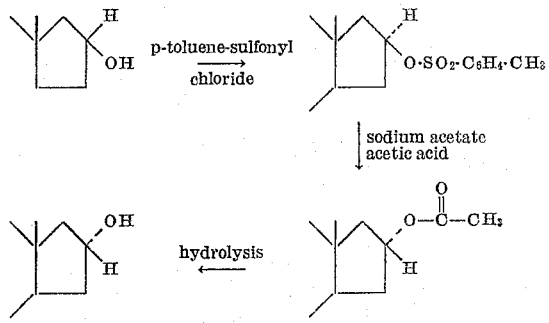

This reaction is operative even though other functional groups such as a keto group, for example, may be present on the steroid nucleus but where other hydroxy groups are present, they may also be blocked by conversion to an ether or ester prior to reaction with an aryl sulfonyl halide, or, as described, the 3β-aryl sulfonate, if formed, may be selectively hydrolyzed off prior to epimerization of the 16β-arylsulfonate group.

The procedures for the preparation of compounds embodying the features of this invention will be set forth in greater detail in the following examples. It will be appreciated that the examples will be applicable for use in the preparation of other steroid 16α-ol compounds and derivatives thereof merely by substitution of the corresponding 16β-ol compounds in substantially equimolecular proportions as parent compounds in the described reactions. It will be further understood that other corresponding ethers and esters of the steroid 16α-ol compounds can also be prepared by substitution of the corresponding etherifying or esterifying agents in the subsequent Examples 2, 3, 4, 5 and 8.

EXAMPLE 1

*Preparation of estradiol-3,16α by epimerization of estradiol-3,16β*

1,3,5(10)-estratrien-3,16β-diol (estradiol-3,16β) in the amount of 1 gram is dissolved in 28 ml. of dry pyridine at ice bath temperature and treated with 4.4 gm. of solid p-toluene sulfonyl chloride. After standing for about 2 days at room temperature, the solution is diluted with ice water containing about 10% sodium chloride and the mixture is permitted to stand for 24 hours at about 5° C. The mixture is extracted with ethyl ether in a separatory funnel and the ethereal phase is washed a number of times, such as 4 times, with equal volumes of water. All of the aqueous phases are carried through a second extraction with ether for complete removal of the tosylate. The ether extracts are evaporated to dryness in a steam bath. The yield of crude ditosylate was about 1.9 gms.

To the ditosylate, there was added 4.8 gms. of freshly fused sodium acetate and 92 ml. of purified acetic acid and the materials were heated to refluxing at a bath temperature of about 138–150° and refluxing was continued for about 1 hour until solution became substantially complete. When cooled to a temperature of about 5° C., the steroid was precipitated with ice water containing 10% sodium chloride during 24 hours, and the precipitate was filtered off and dried and then subsequently saponified with aqueous methanolic potassium hydroxide (200 ml. of methanol and 60 ml. of 2.5 N potassium hydroxide) by refluxing for about 1 hour. The methanol was distilled off and 100 ml. of water was added. To the clear, cool solution, 10 ml. of concentrated hydrochloric acid was added and the pH was adjusted to about 5–6 with the addition of acetic acid. The precipitated steroid was filtered and dried at about 40° C. and provided a yield of about 0.88 gm. Crude estradiol-3,16α having a melting point of 213–215° C. was secured from the product in the amount of 0.55 gm. after recrystallization from Skellysolve B and from aqueous methanol.

The crude material can be further purified by formation of the diacetate and reconversion to the estradiol by acetylating the crude product using 10 ml. of pyridine and 10 ml. of acetic anhydride. The di-ester recrystallized from aqueous methanol to give 0.63 gm. of estradiol-3,16α diacetate having a melting point of 116–117°. The diacetate was dissolved in 127 ml. of methanol, 32 ml. of 2.5 N sodium hydroxide and 95 ml. of water and the solution was refluxed for about 1 hour. When cooled 80% of the alkali was neutralized with concentrated hydrochloric acid and the pH adjusted to between 5 and 6 with acetic acid. The solution was distilled to turbidity and allowed to stand at low temperature for about 24 hours. The crystals obtained upon filtration comprises the product estradiol-3,16α having a melting point of 223–224° C. Further purification by recrystallization from acetone-Skellysolve B and from aqueous methanol raised the melting point to 224–224.5° C. with very slight decomposition. The compound had a rotation of $[\alpha]_D^{25} = +85°$ (c.=0.76 in 95% ethanol).

1,3,5(10),6,8-estrapentaen-3,16α-diol may be prepared by substitution of 1,3,5(10),6,8-estrapentaen-3,16β-diol in equal molecular proportions for the 1,3,5(10)-estratrien-3,16β-diol of Example 1. Similarly, 1,3,5(10),7-estratetraen-3,16α-diol may be prepared by the substitution of 1,3,5(10),7-estratetraen-3,16β-diol in equal molecular proportions for the 1,3,5(10)-estratrien-3,16β-diol in Example 1.

EXAMPLE 2

*Preparation of 1,3,5(10)-estratrien-3,16α-diol diacetate from 1,3,5(10)-estratrien-3,16α-diol*

52 mg. of the diol was acetylated using acetic anhydride in pyridine in the amounts described in the previous example for purification of the diol through formation of the diacetate and reconversion thereof. The diacetate, after recrystallization from 80% methanol was obtained as short, stiff needles having a melting point of 117°.

The diacetates of 1,3,5(10),6,8-estrapentaen-3,16α-diol and the diacetates of 1,3,5(10),7-estratetraen-3,16α-diol may be prepared by the substitution of the corresponding diols for the 1,3,5(10)-estratrien-3,16α-diol in Example 2.

The dipropionates of the foregoing diols can be prepared by the substitution of propionic anhydride for acetic anhydride in Example 2 in equivalent molecular proportions.

EXAMPLE 3

*Preparation of 3-benzoxyestra-1,3,5(10)-trien-16α-ol from estradiol-3,16α*

46 mg. of estradiol-3,16α was dissolved at room temperature in 30 ml. of 0.5 N sodium hydroxide and 0.5 ml. of benzoyl chloride was added to this solution. After agitation for a short time, the mixture was allowed to stand for reaction overnight at room temperature. The monobenzoate that was formed was then filtered from the solution and washed with 0.5 N sodium hydroxide and then with water after which it was dried in vacuo.

A crude monobenzoate was secured which upon recrystallization from acetone-Skellysolve B and from aqueous methanol gave a melting point of 179–181°. An additional recrystallization from 90% methanol produced a product in the form of balls of tiny crystals having a melting point of 179.5–181°.

EXAMPLE 4

*Preparation of 1,3,5(10)-estratrien-3,16α-diol dibenzoate from estradiol-3,16α*

150 mg. of estradiol-3,16α was dissolved in 6.0 ml. of dry pyridine and the solution was treated with 1.5 ml. of benzoyl chloride. The reaction mixture was occasionally stirred over a period of about 24 hours and the dibenzoate was precipitated from the solution with ice water. The dibenzoate, in the form of a reddish oil, was separated and recrystallized from aqueous ethanolic acetone containing a trace of pyridine. The product purified by recrystallization from aqueous ethanol and from acetone-Skellysolve B, and finally from 95% ethanol, gave a yield of 182 mg. having a melting point of 129.5–130.5°. Two further crystallizations from 95% ethanol gave 132 mg. of tiny needles melting at 130.5–131.5°.

The dipropionate, dibutyrate, divalerate, dipalmitate, distearate, bis-phenylacetate, dinaphthoate, bis-cyclopentylpropionate and the ditoluate can be prepared by the substitution of equivalent molecular proportions of the corresponding acid chlorides for the benzoyl chloride in Example 4 above. Similarly, the same esters of 1,3,5(10),6,8-estrapentaen-3,16α-diol and 1,3,5(10),7-estratetraen-3,16α-diol may be prepared by substitution of the corresponding diol for estradiol-3,16α in Example 4 and the further substitution of the named acid chlorides. When the acid chlorides are used it is preferred to heat the reactants for about one hour below reflux temperature.

EXAMPLE 5

*Preparation of 3-methoxyestra-1,3,5(10)-trien-16α-ol acetate*

118 mg. of 3-methoxyestra-1,3,5(10)-trien-16β-ol was dissolved in 2 ml. of dry pyridine and reacted with 0.2 gm. of p-toluene-sulfonyl chloride to form the corresponding 16-p-toluene-sulfonate as described in Example 1. To the dry product of about 101 mg., 200 mg. of freshly fused sodium acetate and 4.0 ml. of purified acetic acid was added. The mixture was refluxed in an oil bath under anhydrous conditions for about 1 hour and the mixture was extracted with ethyl ether upon cooling. The ether extract was washed with water, with 0.5 N sodium hydroxide, and again with water, and the ethereal residue was dissolved in 44 ml. of 95% ethanol and 11 ml. of 10% sodium hydroxide and then refluxed for about 1 hour. The refluxed solution, at room temperature, was extracted with ethyl ether and the ether extract was washed with 0.25 N sodium hydroxide and with water. After removal of the ether, the dried product, 3-methyl-estradiol-3,16α, was acetylated in pyridine and acetic anhydride and the acetate which was formed was precipitated with ice water. After separation, the oily compound was dried in vacuo and after charcoaling in acetone and crystallizing from methanol, 38 mg. of long needles of estradiol-3-methyl ether-16α acetate was secured having a melting point of 123–123.5°.

Invention is believed also to exist, in accordance with the concepts of this invention, in the epimerization of the 16β androstane compound described to the corresponding 16α-hydroxy steroid and the ether and ester derivatives thereof, as hereinafter defined. Thus description will be given with respect to the preparation of androstan-3β,16β-diol from androstan-3β-ol-16-one benzoate and to the preparation of the 16α epimer thereof and the esters and ethers thereof.

EXAMPLE 6

*Preparation of androstan-3β,16β-diol from androstan-3β-ol-16-one benzoate*

575 mg. of androstan-3β-ol-16-one benzoate was dissolved under reflux in 300 ml. of methanol. The solution was quickly chilled to room temperature and 0.39 gm. of solid sodium borohydride was added for reduction. After the solution had been swirled for about 1 hour, 4 ml. of 50% acetic acid was slowly added, and the solution was reduced to a volume of 100 ml. by distillation on a steam bath and then cooled with 100 ml. of ice water. 550 mg. of 3β-benzoxy-androstan-16β-ol having a melting point of 168–169° was secured by crystallization after standing 2 days in an ice box.

EXAMPLE 7

*Preparation of androstan-3β,16α-diol from 3-benzoyl-androstan-3β,16β-diol*

400 mg. of 3β-benzoylandrostan-16β-ol was dissolved in 8 ml. of dry pyridine and the solution treated with 0.8 gm. of solid p-toluenesulfonyl chloride. The 16-tosylate was precipitated with ice water after standing for a day at room temperature with occasional swirling and the precipitate was filtered and washed with water and subsequently dried in vacuo.

The tosylate was covered with 1 gm. of freshly fused sodium acetate and refluxed for 1 hour in a solution of 20 ml. of purified acetic acid in an oil bath having a temperature of 137–153° C. After the epimerization mixture had cooled, it was extracted with ethyl ether and water and then the ethereal phase was washed with 1 N sodium hydroxide and with water and then evaporated to dryness. The residue was dissolved in a solution of 7.5 gm. of potassium hydroxide, 12.5 ml. of water and 100 ml. of methanol and saponified for about 24 hours at room temperature. The free diol was extracted with ethyl ether, and washed with 1 N alkali and with water. The diol secured upon evaporation of the ether was then recrystallized from acetone-Skellysolve B to produce a product having a melting point of 184.5–186.5°. Additional purification by recrystallization from methyl ether ketone-n-heptane and from acetone-Skellysolve B increased the melting point to 187.5–188°. The compound had a rotation of $[\alpha]_D^{25} = -4°$ (c.=0.777 in 95% ethanol).

By way of further example, Δ⁵-androstene-3β-ol-16-one benzoate or etiocholan-3α-ol-16-one benzoate can be substituted for the androstan-3β-ol-16-one benzoate in equimolecular proportions in Example 6 to form the corresponding 16β-diol and the diol can be substituted for the parent compound in Example 7 for epimerization to form the corresponding diol in which the hydroxy group on the $C_{16}$ position is in $\alpha$ configuration.

EXAMPLE 8

*Preparation of androstan-3β,16α-diol diacetate*

0.1 gm. of androstan-3β,16α-diol was acetylated with 2 ml. of pyridine and 2 ml. of acetic anhydride. After several recrystallizations from 90% methanol, the androstan-3β,16α diol diacetate was secured in the form of flat plates having a melting point of 174–174.5° and a rotation of $[\alpha]_D^{23}=-26°$ (c.=0.963 in chloroform).

EXAMPLE 9

*Preparation of 3-methyl ether of estradiol-3,16α*

38 milligrams of estradiol-3,16α are covered with a mixture of 8 cc. of 90% methanol containing 0.8 gm. of anhydrous potassium carbonate. The estradiol-3,16α is dissolved by heating the mixture under reflux and 0.3 cc. of dimethyl sulfate are added. After the initial reaction has subsided an additional 0.3 cc. of dimethyl sulfate are added. Refluxing is continued for about 45 minutes from the first addition of dimethyl sulfate. 4 cc. of water is added and the resulting mixture distilled until it becomes turbid. The latter mixture is filtered, washed with water and dried under vacuum in a desiccator over sulfuric acid and anhydrous potassium hydroxide. The dried product is taken up in acetone and the acetone solution is evaporated to dryness on a steam bath. The oily product obtained after removal of the acetone is the 3-methyl ether of estradiol-3,16α.

To prepare other 3-ethers of estradiol-3,16α such as the 3-ethoxy, 3-propyloxy, 3-benzyloxy, 3-butyloxy on the like ether groups as described above, the dimethyl sulfate of Example 9 can be substituted with equivalent molecular amounts of the corresponding sulfates.

Ether groups may also be formed on the 16α-hydroxy group by the reaction of the diol, as in Example 9, with at least twice the amount of dimethyl-, diethyl-, dipropyl- and the like sulfates, preferably in the presence of acetone and alkali or the 3-ethers prepared in accordance with Example 9 may be further reacted with dimethyl, diethyl, dipropyl and the corresponding sulfates in the presence of acetone and alkali.

Similarly, mono- and di-ethers of the other diols previously described such as 1,3,5(10),6,8-estrapentaen-3,16α-diol, 1,3,5(10),7-estratetraen-3,16α-diol, androstan-3β,16α-diol or $\Delta^5$-androsten-3β,16α-diol may be formed by the substitution of the corresponding diols in equivalent molecular proportions in Example 9.

Derivatives of the foregoing compounds having an ether group in α-position on $C_{16}$ and a phenolic hydroxy group on $C_3$ can be prepared by reaction of the corresponding 3-benzyl ether with dimethyl sulfate, diethyl sulfate, dipropyl sulfate and the like etherifying compound, etc., in the presence of acetone and alkali to form the corresponding ether on $C_{16}$, as described in Example 9. The mixed ether that is formed can then be treated to remove the 3-benzyl ether by hydrogenolysis using palladium-charcoal as the catalyst.

The dipropionate, dibutyrate, divalerate, dipalmitate, distearate, bis-phenylacetate, dinaphthoate, bis-cyclopentyl-propionate and the ditoluate of androstan-3β,16α-diol by reacting the latter with equivalent molecular proportions of the corresponding acid chlorides or anhydrides and the corresponding esters of the $\Delta^5$-androsten-3β,16α-diol can be prepared by the substitution of the diol in Example 8.

Equilenin-16-one can be reduced with sodium borohydride or hydrogen in the presence of Adams catalyst to produce the corresponding diol-3,16β. The diol can be substituted in equimolecular proportions for the parent compound, estradiol-3,16β, in Example 1 to form the corresponding diol-3,16α. Similarly, other 16-keto estrogen or androgen compounds can be reacted to produce the corresponding diols having the hydroxy group in the $C_{16}$ position in α spatial configuration.

The diols referred to above may be further reacted by substitution in equimolecular proportions in Examples 2–5 or in Example 8 to form the corresponding ethers and esters such as the diacetates, dibenzoates, 3-monobenzoates, or 3-methyl ether 16-acetates and the like.

It will be apparent from the foregoing that I have produced new and novel steroids having a hydroxy group on the $C_{16}$ position in α configuration and that I have provided new and improved methods for producing same.

It will be understood that invention exists also in the manufacture of other compounds described in the foregoing and that changes may be made in the details of the procedures and the materials employed therein for manufacture of the described compounds without departing from the spirit of the invention, especially as defined in the following claims.

What I claim is:

1. A compound of the group consisting of androstan, etiocholan, estratrien and estrapentaen compounds having the structural formula

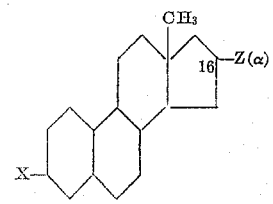

wherein X and Z are groups selected from the group consisting of —OH, —OCH$_2$R$^1$ and —OOCR$^1$ and wherein R$^1$ is of the group consisting of hydrogen and hydrocarbon radicals having from one to seventeen carbon atoms.

2. The compound $\Delta^{1,3,5(10)}$-estratrien-3,16α-diol.
3. The compound estradiol-3,16α-diacetate.
4. The compound estradiol-3,16α-3-monobenzoate.
5. The compound estradiol-3,16α-3-methyl ether-16-acetate.
6. The compound 3-methyl-estradiol-3,16α.
7. In a method for the preparation of a compound of the group consisting of androstan, etiocholan, estratrien and estrapentaen compounds having the structural formula

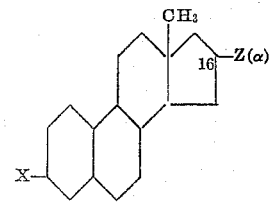

wherein X and Z are groups selected from the group consisting of —OH, —OCH$_2$R$^1$ and —OOCR$^1$ and wherein R$^1$ is of the group consisting of hydrogen and hydrocarbon radicals having from one to seventeen carbon atoms, the steps wherein said compound having a hydroxy group at $C_{16}$ of β configuration is reacted with an aryl sulfonyl halide to form the corresponding $C_{16}$-aryl sulfonic acid ester, and then reacting said ester with an alkali metal salt of a lower aliphatic acid in a reaction medium comprising a lower aliphatic acid to form a $C_{16\alpha}$ lower aliphatic acid ester of said compound.

8. Method in accordance with claim 7 wherein the 16α-lower aliphatic acid ester is hydrolyzed and a compound wherein the hydroxy group in $C_{16}$ position is in α configuration is obtained.

9. Method in accordance with claim 7 wherein the arylsulfonyl halide is p-toluene sulfonyl chloride.

10. A method in accordance with claim 7 wherein the lower aliphatic acid is acetic acid.

11. A method in accordance with claim 7 wherein the aryl sulfonic acid halide is p-toluene sulfonyl chloride, the lower aliphatic acid is acetic acid and the alkali metal salt is sodium acetate.

12. A method in accordance with claim 7 wherein the free 16α-hydroxy group formed on hydrolysis is then reacted with an esterifying agent to form a 16α-ester.

13. A method in accordance with claim 8 wherein the free 16α-hydroxy group formed on hydrolysis is then reacted with an etherifying agent to form a 16α-ether.

References Cited in the file of this patent

UNITED STATES PATENTS 2,705,239    Huffman   _____ Mar. 29, 1955

FOREIGN PATENTS 228,548    Switzerland   _____ Jan. 3, 1944

OTHER REFERENCES

Fieser et al.: Natural Products Related to Phenanthrene (1949), 3rd ed., pp. 323–4, 375.